(12) United States Patent
Bian et al.

(10) Patent No.: US 7,363,410 B2
(45) Date of Patent: *Apr. 22, 2008

(54) FLEXIBLE INTERRUPT HANDLING METHODS FOR OPTICAL NETWORK APPARATUSES WITH MULTIPLE MULTI-PROTOCOL OPTICAL NETWORKING MODULES

(76) Inventors: Qiyong B. Bian, 2882 NW. Overlook Dr., #1818, Hillsboro, OR (US) 97124; Jonathan A. Tuchow, 5470 NW. 196th Pl., Portland, OR (US) 97229

(*) Notice: Subject to any disclaimer, the term of this patent is extended or adjusted under 35 U.S.C. 154(b) by 63 days.

This patent is subject to a terminal disclaimer.

(21) Appl. No.: 11/551,914

(22) Filed: Oct. 23, 2006

(65) Prior Publication Data

US 2007/0079023 A1    Apr. 5, 2007

Related U.S. Application Data

(63) Continuation of application No. 10/211,001, filed on Aug. 2, 2002, now Pat. No. 7,130,948.

(51) Int. Cl.
*G06F 13/24* (2006.01)
(52) U.S. Cl. .................. 710/260; 710/263; 710/268
(58) Field of Classification Search ........ 710/260–269, 710/45–50, 305–315; 709/200–202, 207, 709/230
See application file for complete search history.

(56) References Cited

U.S. PATENT DOCUMENTS

| | | | |
|---|---|---|---|
| 6,038,633 A | 3/2000 | Tavallaei | |
| 6,075,788 A | 6/2000 | Vogel | |
| 6,148,361 A | 11/2000 | Carpenter et al. | |
| 6,243,787 B1* | 6/2001 | Kagan et al. | 710/263 |
| 6,460,105 B1 | 10/2002 | Jones et al. | |
| 6,564,277 B1 | 5/2003 | Keen et al. | |
| 6,567,413 B1 | 5/2003 | Denton et al. | |
| 6,606,676 B1 | 8/2003 | Deshpande et al. | |
| 6,775,730 B2* | 8/2004 | Marr et al. | 710/266 |
| 6,779,065 B2 | 8/2004 | Murty et al. | |
| 6,813,665 B2 | 11/2004 | Rankin et al. | |

* cited by examiner

*Primary Examiner*—Raymond N Phan
(74) *Attorney, Agent, or Firm*—Berkeley Law & Technology Group, LLP (57) ABSTRACT

An API including an interrupt handler registration function and one or more interrupt dispatchers, is provided to an optical networking apparatus to facilitate registration of interrupt handlers to handle interrupts triggered by the function blocks of multi-protocol optical networking modules (MPONM). Each registered interrupt handler may handle interrupts triggered by one or more function blocks of any of the MPONM, and/or for one or more cause. In one embodiment, the one or more interrupt dispatchers are equipped to determine the triggering function block and the cause, and determine the interrupt handlers, if any, are to be notified. Each of the interrupt handlers to be notified is notified accordingly, including the triggering function block and the cause.

60 Claims, 9 Drawing Sheets

* Only Interrupt Handling Relevant Functions are shown.

FLEXIBLE INTERRUPT HANDLING METHODS FOR OPTICAL NETWORK APPARATUSES WITH MULTIPLE MULTI-PROTOCOL OPTICAL NETWORKING MODULES

CROSS-REFERENCE TO RELATED APPLICATION

This application is a continuation of U.S. patent application Ser. No. 10/211,001 filed Aug. 2, 2002 now U.S. Pat. No. 7,130,948, which is incorporated herein by reference in its entirety.

FIELD OF THE INVENTION

The present invention relates to software methods and networking apparatuses. More specifically, the present invention relates to flexible interrupt handling methods for multi-protocol optical networking modules (MPONM) in an optical networking apparatus.

BACKGROUND OF THE INVENTION

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional, as well as wide area networks.

As a result of this trend of increased connectivity, an increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high speed delivery of a large volume of data across wide areas. As a result, high speed data trafficking devices, such as high speed optical, or optical-electro routers, switches and so forth, are needed.

Unfortunately, because of the multiplicity of protocols, including datacom and telecom protocols, that may be employed to traffic data in the various types of networks, designers and developers of networking components and equipment, such as line cards, routers and switchers, have to wrestle with a multitude of prior art protocol processors. Each of these protocol processors is typically dedicated to the support of either local/regional or regional/wide area protocols, in their design of these components/equipment. This burden is costly, and slows down the advancement of high speed networks.

U.S. patent application Ser. Nos. 09/860,207 and 09/861,002, both filed on May 18, 2001, entitled "A MULTI-PROTOCOL NETWORKING PROCESSOR WITH DATA TRAFFIC SUPPORT SPANNING LOCAL, REGIONAL AND WIDE AREA", and "AN OPTICAL NETWORKING MODULE INCLUDING PROTOCOL PROCESSING AND UNIFIED SOFTWARE CONTROL" respectively, disclosed a novel highly flexible multi-protocol processor capable of supporting high-speed data traffic in local, regional, and wide area networks, and a multi-protocol optical networking module that can be constructed from such a multi-protocol processor. Resultantly, sophisticated optical-electrical networking apparatuses such as optical-electrical routers and switches may be built more efficiently with multiple ones of the disclosed multi-protocol optical networking module (each having its own multi-protocol processor).

In turn, the task for developing networking applications for such sophisticated optical-electrical networking apparatus with multiple ones of the disclosed multi-protocol optical networking module (each having its own multi-protocol processor) have become much more difficult, in particular, the task for handling various interrupts that may occur from the various multi-protocol optical networking module. Accordingly, a software architecture, including methods, that reduces the complexity and improves the ease for developing networking applications for such complex networking apparatuses with multiple ones of the disclosed multi-protocol optical networking module (each having its own integrated multi-protocol processor) is desired.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes software methods, in particular, an application programming interface (API) for networking applications to interact with function blocks of multi-protocol processors of the MPONM of an optical-electrical networking apparatus, including an API having registration and dispatcher functions that support flexible handling of interrupts of the various MPONM.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as data, variables, methods, request, return, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will be described using networking terms, including but are not limited to:

| | |
|---|---|
| Egress | Outgoing data path from the system to the network |
| HDLC | High-Level Data Link Control. A communication protocol used in Packet Over SONET switching network. |
| Ingress | Incoming data path from the network to the system |
| IP | Internet Protocol |
| LAN | Local Area Network |
| MAC | Media Access Control layer, defined for Ethernet systems |
| POS | Packet Over SONET |
| PPP | Point to Point Protocol |
| SONET | Synchronous Optical NETwork, a PHY telecommunication protocol |
| WAN | Wide Area Network |

The terms "provide" and "providing", and other terms of the like, as used in this specification and in the claims, include indirect as well as direct provision of the object of the provision operation. That is, an entity A may "provide" another entity B with an item C (the object of the provision operation) directly, or indirectly by providing entity B with the information to obtain object item C, such as a pointer to a location from which the object item C may be obtained.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
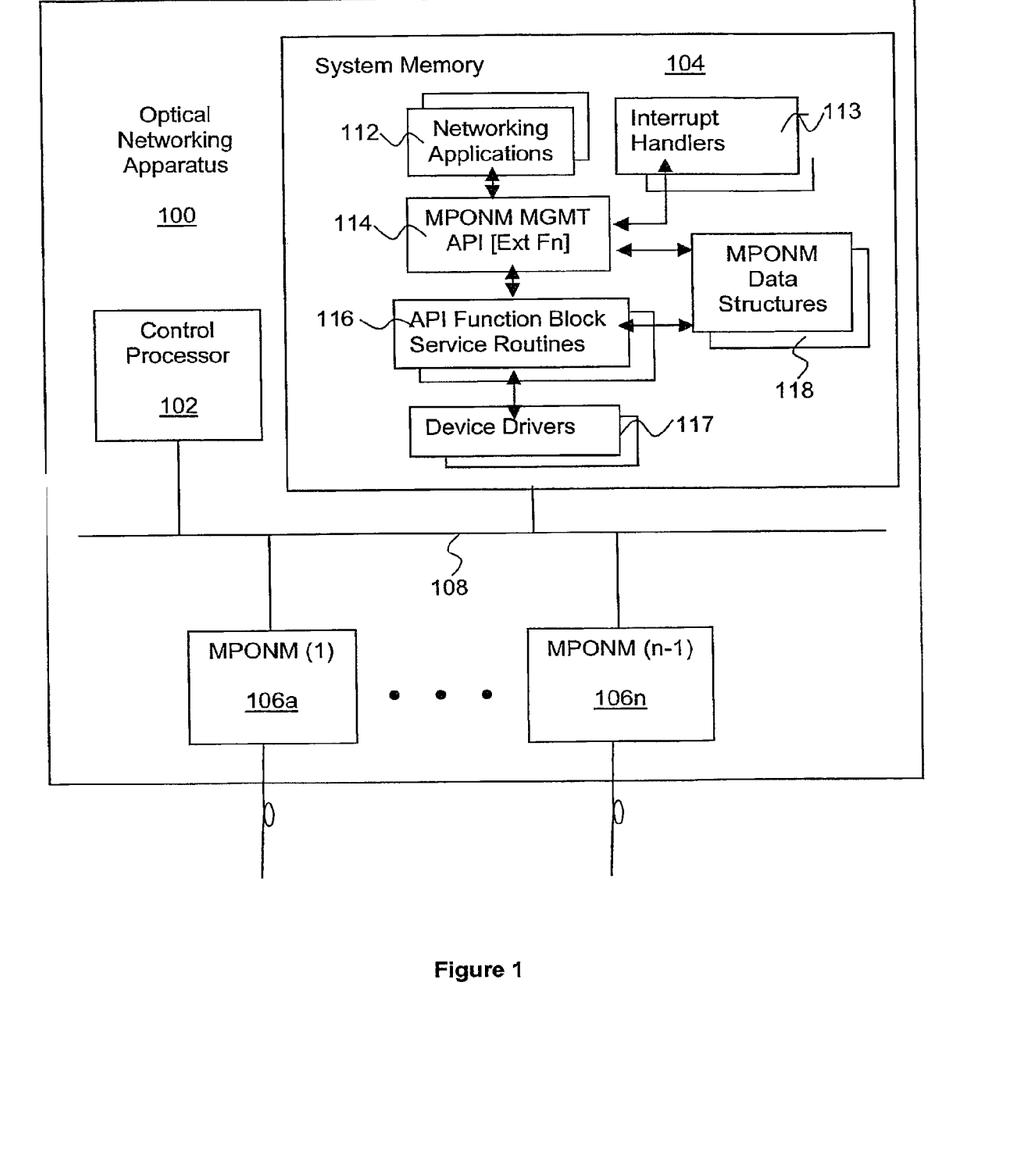
FIG. 1 illustrates an overview of the software methods of present invention, including an optical-electrical networking apparatus having multiple MPONM (each integrated with a multi-protocol processor), within which the present invention may be practiced, in accordance with one embodiment.
Figure 5A:
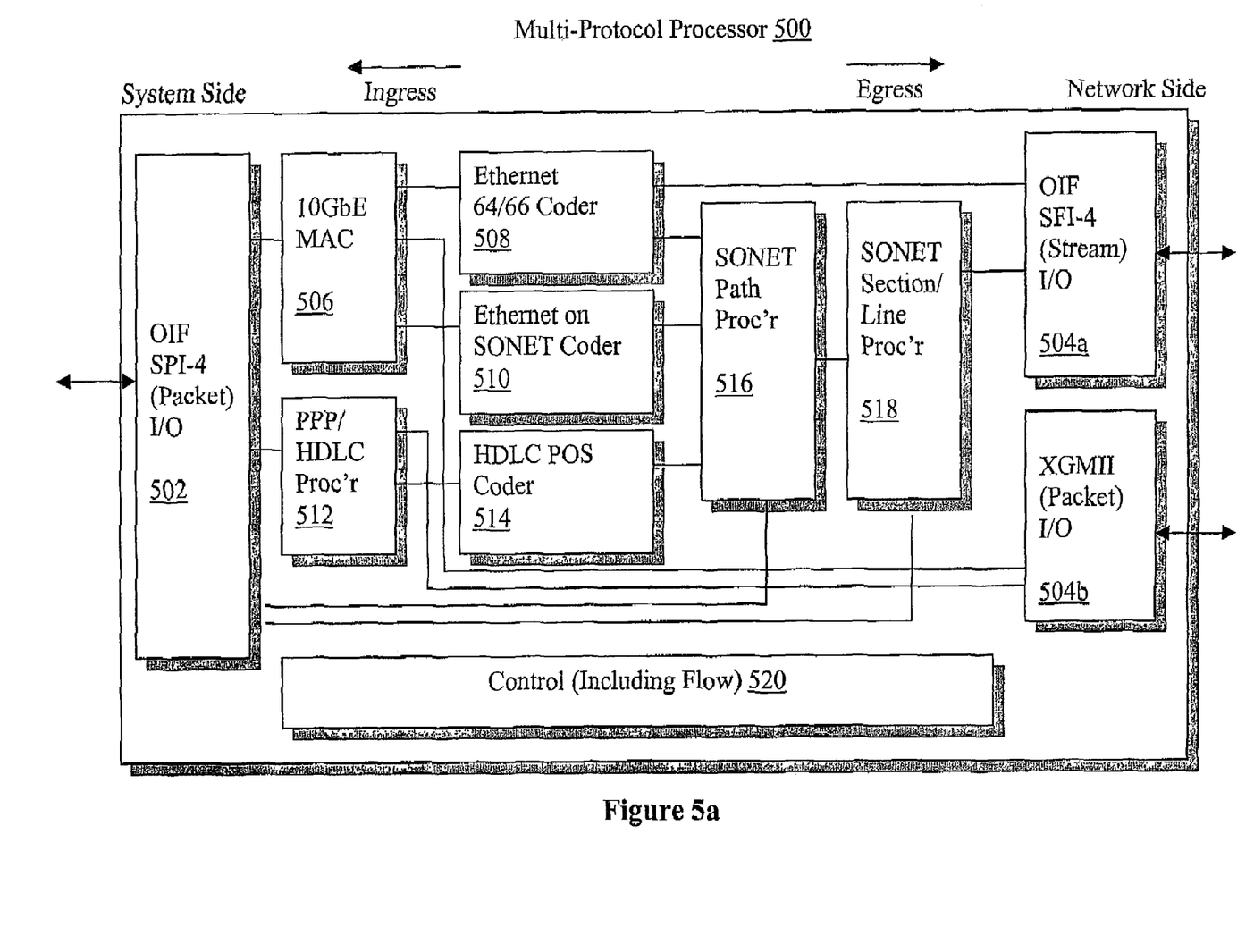
FIGS. 5a-5b illustrate a multi-protocol processor of a MPONM and the interrupt handling relevant aspects of MPONM API of FIG. 1 in further details, in accordance with one embodiment each.
Figure 5B:
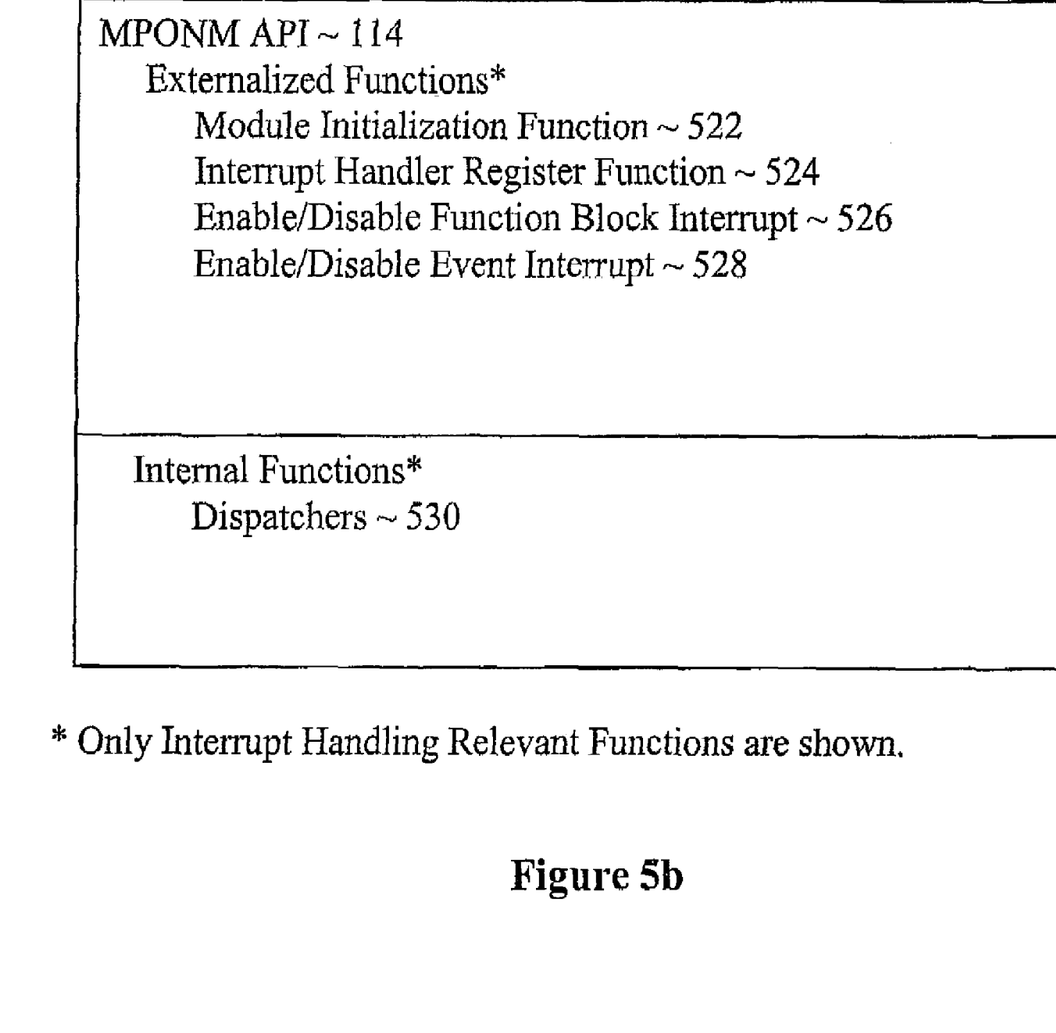

Referring now to FIGS. 1 and 5a-5b, wherein three block diagrams illustrating an overview of the software methods of the present invention, in accordance with one embodiment, including an optical-electrical networking apparatus 100 having multiple MPONM 106a-106n within which the present invention may be practiced, are shown. As illustrated, for the embodiment, optical networking apparatus 100 includes a number of MPONM 106a-106n, a control processor 102, and memory 104, coupled to each other through system bus 108. Each of MPONM 106a-106n includes at least one multi-protocol processor having a number of function blocks, as illustrated in FIG. 5a, and physical layer optical-electrical components (not shown), as described in the above identified co-pending U.S. pending patent applications.

In various embodiments, the various MPONM 106a-106n may be connected to system bus 108 in like or different manners. For examples, all MPONM 106a-106n may be connected via corresponding parallel interfaces, or some MPONM 106* are connected via corresponding serial interfaces, while others are connected via corresponding parallel or other bus interfaces.

Accordingly, for the embodiment, various device drivers 117 are provided to facilitate the various corresponding types of interfaces for connecting MPONM 106a-106n to system bus 108. That is, a serial interface oriented device driver 117 is provided to facilitate connection of some or all of MPONM 106a-106n via corresponding serial interfaces, a parallel interface oriented device driver 117 is provided to facilitate connection of some or all of MPONM 106a-106n via corresponding parallel interfaces, and so forth.

In one embodiment, the function blocks of a multi-protocol processor include a system interface block 502, network interface blocks 504a-504b, a MAC block 506, an Ethernet 64/66 coder 508, an Ethernet on SONET coder block 510, a PPP protocol and HDLC processor block 512, a HDLC Packet over SONET coder block 514, a SONET path processor block 516, a SONET section and line processor block 518, and a control interface 520. The various function blocks 502-520 are selectively employed in combination to service data transmission and receipt in accordance with a selected one of a number of frame based protocols, including frame based protocols encapsulated within a synchronous protocol, as well as streaming and packet variants of the synchronous protocol. These protocols include at least one each a datacom and a telecom protocol.

Briefly, the system interface block 502 is employed to facilitate input of egress data from the system and output of ingress data to the system from MPONM. The MAC block 506 is employed to perform data link sub-layer media access control processing on egress and ingress MAC data. The Ethernet 64/66 coder and Ethernet on SONET Coder blocks 508-510 are provided to perform physical sub-layer 64/66 and Ethernet on SONET coding and decoding for the egress and ingress MAC data respectively.

The PPP/HDLC processor block 512 is employed to perform data link sub-layer point-to-point protocol and high level data link control processing on IP, PPP, and HDLC data. The PPP/HDLC processor 512 is employed to frame or de-frame IP and POS data, providing appropriate encapsulation or de-encapsulation, in accordance with PPP and HDLC. The HDLC POS coder block 514 is provided to perform physical sub-layer Packet Over SONET coding and decoding for the egress and ingress HDLC data respectively.

The SONET path processor block 516 is provided to perform path processing for "packetized" SONET data and coded frame-based data, whereas the SONET section and line processor block 518 is provided to perform section and line processing for "packetized" as well as "streaming" SONET data. The network interface blocks 504a-504b are provided to facilitate output of egress data and input of ingress data.

Control interface 520 is employed to facilitate interaction between the multi-protocol processor and external devices.

The optical-electrical components of a MPONM 106* include e.g. digital-to-analog and analog-to-digital components, as well as laser components for encoding data on an optical beam and/or decoding data from an encoded optical beam. For the purpose of the present application, the optical-electrical components of a MPONM 106* is also referred to as a "function block". Accordingly, the term "function block" as used in the claim refers to a selected one of the function blocks of a multi-protocol processor and the collection of the optical-electrical components of a MPONM 106*.

Further, one or more of the function blocks (including the collection of optical-electrical components of a MPONM 106*) are equipped to trigger interrupts for a variety of events or reasons.

Thus, if networking applications 112 are required to access, control or otherwise interact with each of these function blocks of each of the multi-protocol processors of the MPONM directly, the complexity may become if not prohibitive, at least not very productive for the average software developers, especially in view of the multiplicity of multi-protocol processors and MPONM present in each optical networking apparatus 100, and the different manners the MPONM 106* may be connected.

Accordingly, to enable networking apparatus 100 to be used for a variety of networking applications, the present invention advantageously enables network applications 112 to flexibly provide for interrupt handlers 113 to handle various interrupts of interest in an application dependent manner. As will be readily apparent from the description to follow, the present invention further advantageously enables the flexible provision of interrupt handling in a reduced complexity manner.

In various embodiments, each multi-protocol processor 500 includes a number of global control/status registers (not shown), in particular, one or more global control/status registers for correspondingly storing one or more identifiers of interrupt triggering function blocks (including each collection of optical-electrical components of a MPONM 106*) of one or more interrupt lines. Further, each function block (including each collection of optical-electrical components of a MPONM 106*) equipped to trigger interrupts also includes among its function block control/status registers (not shown), one or more function block control/status registers for correspondingly storing one or more causes (e.g. event types) for the interrupts of the one or more interrupt lines.

Together, these control/status registers enable the triggering function block and the cause for each interrupt to be readily determined. Resultantly, varying number of interrupt handlers 113 may be provided in varying manners to handle various combinations of interrupts of various triggering function blocks and causes, irrespective of MPONM 106*.

Further, to reduce the implementation complexity for the designers of networking applications 112, an API 114, having at least an externalized module initialization function 522 and an externalized interrupt handler registration function 524 (FIG. 5b) are provided to facilitate interactions between networking applications 112 and MPONM 106*, with respect to interrupt handling. For the embodiment of FIG. 5b, API 114 further includes a number of externalized function block as well as event type interrupt enabling/disabling functions 526-528, and a number of internal dispatcher functions 530 (FIG. 5b). The terms "externalized" and "internal" are used in the current context from the visibility perspective of networking applications 112, for ease of understanding. The characterization has no significance with respect to practicing the present invention.

For ease of understanding, only interrupt handling relevant functions of API 114 are shown and described. In various embodiments, API 114 may further include other functions to facilitate other interactions between networking applications 112 and MPONM 106*. Additionally, as illustrated in FIG. 1, corresponding function block service routines 116 are also provided for interfacing with corresponding like ones of the function blocks of the multi-protocol processors of the MPONM 106*.

Module initialization function 522 is employed to initialize corresponding data structures 118 for MPONM 106*, including interrupt handling related data, to facilitate the interactions, including interrupt handling.

Interrupt handler register function 524 is employed to facilitate networking applications 112 in registering one or more interrupt handlers 113 to handle the various interrupts triggered by the various function blocks of MPONM 106*. In one embodiment, each registration identifies the registering interrupt handler 113 and the interrupts of interest. In one embodiment, the interest is specified in terms of at least one of the triggering function block and/or the cause interest.

That is, an interrupt handler 113 may be registered to specifically handle interrupts triggered for a particular event type by a particular function block (of any MPONM 106*). Alternatively, the interrupt handler 113 may be registered to handle interrupts triggered for the particular event type by any function block (of any MPONM 106*).

In yet other alternatives, the interrupt handler 113 may be registered to handle interrupts triggered for a plurality of event types by the particular function block (of any MPONM 106*). In still yet other alternatives, the interrupt handler 113 may be registered to handle interrupts triggered for a plurality of event types by a plurality of function blocks (of any MPONM 106*).

Note that resultantly, under the present invention, an interrupt may be handled by one or more registered interrupt handlers 113.

Interrupt Dispatcher functions 530 are employed to determine the appropriate registered interrupt handler or handlers 113 to be notified of the interrupts; and notify the interrupt handler or handlers 113 accordingly.

In one embodiment, a primary and two auxiliary dispatcher functions 530 are provided. The primary dispatcher function 530 is employed to receive and clear a received interrupt. The two auxiliary dispatcher functions 530 are employed to determine and notify the appropriate registered interrupt handler or handlers 113 to handle the interrupts triggered by a function block of a multi-protocol processor and the interrupts triggered by the collection of electrical-optical components of a MPONM 106* respectively.

Enabling/Disabling interrupt functions 526-528, as their names suggest, are employed to enable/disable interrupt generations by the various function blocks of the MPONM 106* during operation, at the occurrence of selected events. For the embodiment, Enable/Disable Function Block Interrupt 526 enables/disables interrupt generations by a function block in general, while Enable/Disable Event Interrupt 528 enables/disables interrupt generations by a function block for one or more specific event types.

In various embodiment, a function block will also stop generating an interrupt for the occurrence of certain event, if a prior generation was not acknowledged by control processor 102.

In one embodiment, portions of module data structures 118 are also used by the above described interrupt handling related functions to store a portion or all of interrupt handling related data.

Except for MPONM API 114, including the module initialization, interrupt handler registration, interrupt dispatcher and enabling/disabling functions 522-530, and the manner networking applications 112 cooperate with MPONM API 114, in particular, with respect to interrupt handling, networking applications 112 and function block service routines 116 otherwise represent a broad range of such elements known in the art. Accordingly, except for the manner networking applications 112 and function block service routines 116 cooperate with MPONM API 114, the two elements will not be otherwise further described.

[The asterisk at the end of a reference number denotes a "wild card", representing any of the trailing suffixes of the reference numbers employed in a figure. For example, 106* stands for one or more of 106a, 106b or any one of the other 106 references of FIG. 1.]

Networking Applications

Figure 2A:
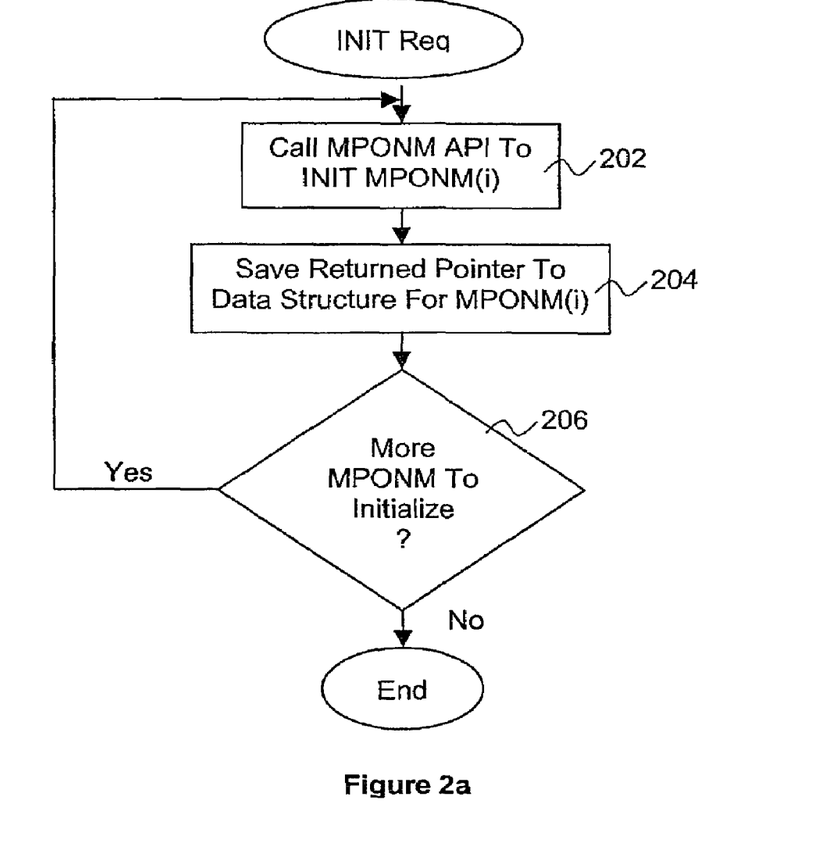
FIGS. 2a-2b illustrate the operational flow of the relevant aspects of a networking application of FIG. 1 interacting with the MPONM API of the present invention, to access, control and/or otherwise interact with the function blocks of the multi-protocol processor of the MPONM, in accordance with one embodiment.
Figure 2B:
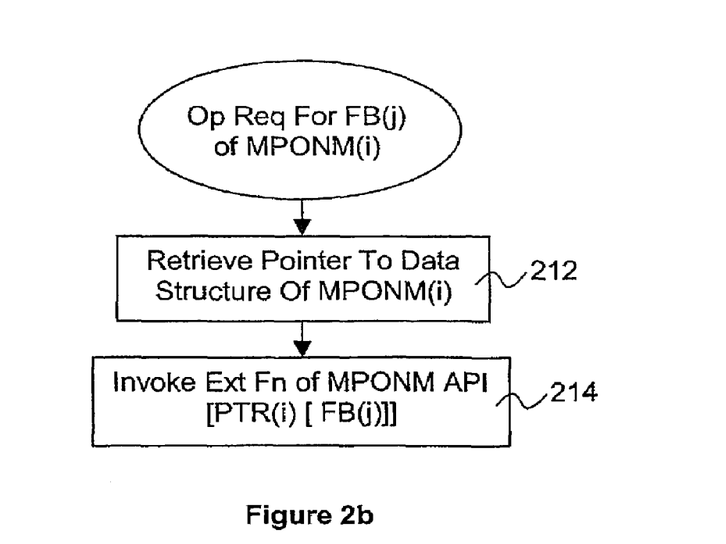

FIGS. 2a-2b illustrate the general operating flow of networking applications 112 for practicing the present invention, in accordance with one embodiment. As illustrated in FIG. 2a, under the present invention, i.e. with the provision of MPONM API 114 including module initialization function 522, at initialization or a subsequent point in time during operation, at the desire of a networking application 112, the networking application 112 invokes module initialization function 522 of NPOMN API 114 to initialize a desired MPONM 106 it wants to subsequently access, control or otherwise interact with, block 202.

In one embodiment, networking application 112 identifies the particular MPONM 106* by providing the "handle" of the device driver 117 handling the connecting interface through which the particular MPONM 106* is connected to bus 108, and if applicable, information (such as memory mapped addresses, port numbers and so forth) associated with how the particular MPONM 106* is mapped on the connecting interface.

As will be described in more detail below, in response, module initialization function 522 of MPONM API 114 in conjunction with the function block service routines 116 advantageously create an instance of a module data structure 118 for the MPONM 106* (if the data structure 118 has not been previously created for the MPONM 106*) to facilitate subsequent access, control and/or interaction with the MPOMN 106* by networking applications 112.

As part of the initialization process, a basic interrupt handling framework for handling interrupts triggered by the various function blocks of the MPONM 106* being initialized, is also initialized, to be described more fully below.

At the end of the initialization process, a handle of the module data structure 118 for the MPONM 106* is returned. More specifically, in one embodiment, the "handle" is a pointer to the module data structure 118 of the MPONM 106*.

Thus, as illustrated, networking application 112 saves the returned handle (or pointer) to the module data structure 118 for the MPONM 106, upon receipt of the handle (or pointer) from module initialization function 522 of MPONM API 114.

Thereafter, networking application 112 determines if another MPONM 106 is to be initialized, block 206. If so, operations 202-204 are repeated; else the initialization process for networking application 112 continues and proceeds to completion.

In other embodiments, module initialization function 522 may support each initialization request requesting initialization of one or more desired MPONM 106* instead. For these embodiments, more than one desired MPONM 106* may be specified in a single request, with the request returning multiple corresponding handles (or pointers) for the successfully initialized ones of the requested MPONM 106*.

As illustrated in FIG. 2b, upon having a need to request a service, e.g. registering an interrupt handler for interrupts triggered by certain function blocks or caused by certain events, or having an operation performed in a function block of a MPONM 106*, networking application 112 retrieves the handle (or pointer) to the data structure 118 of the MPONM 106*, block 212, formats, and submits the request to an appropriate externalized function of MPONM API 114.

For example, if a networking application 112 desires to register one or more interrupt handlers to handle interrupts triggered by certain function block(s) of the MPONM and/or triggered for particular events, the networking application 112 may invoke externalized interrupt handler register function 524 to register the interest and the interrupt handler.

For the embodiment, each request, including the example interrupt handler registration request, may include an identification of the function block within which the requested service/operation is related/to be performed. However, generally, the identification of the function block is not particularized to a MPONM 106*; and neither is an identification of the MPONM 106* provided. Instead, the MPONM 106* within whose identified function block the requested service/operation is related/to be performed is implicitly identified. More specifically, for efficiency of operation, the handle (or pointer) of the data structure 118 of the MPONM 106 is provided.

As those skilled in the art would appreciate, the implicit reference through the handle or pointer of the data structure 118 of the MPONM 106* of interest, improves the ease of the use for the software developers of networking applications, who are more use to working with handles/pointers, as opposed to having to be cognizant of specific hardware modules and hardware details, including the details of the connection interfaces through which the MPONM 106* are correspondingly connected.

Module Data Structure

Figure 3:
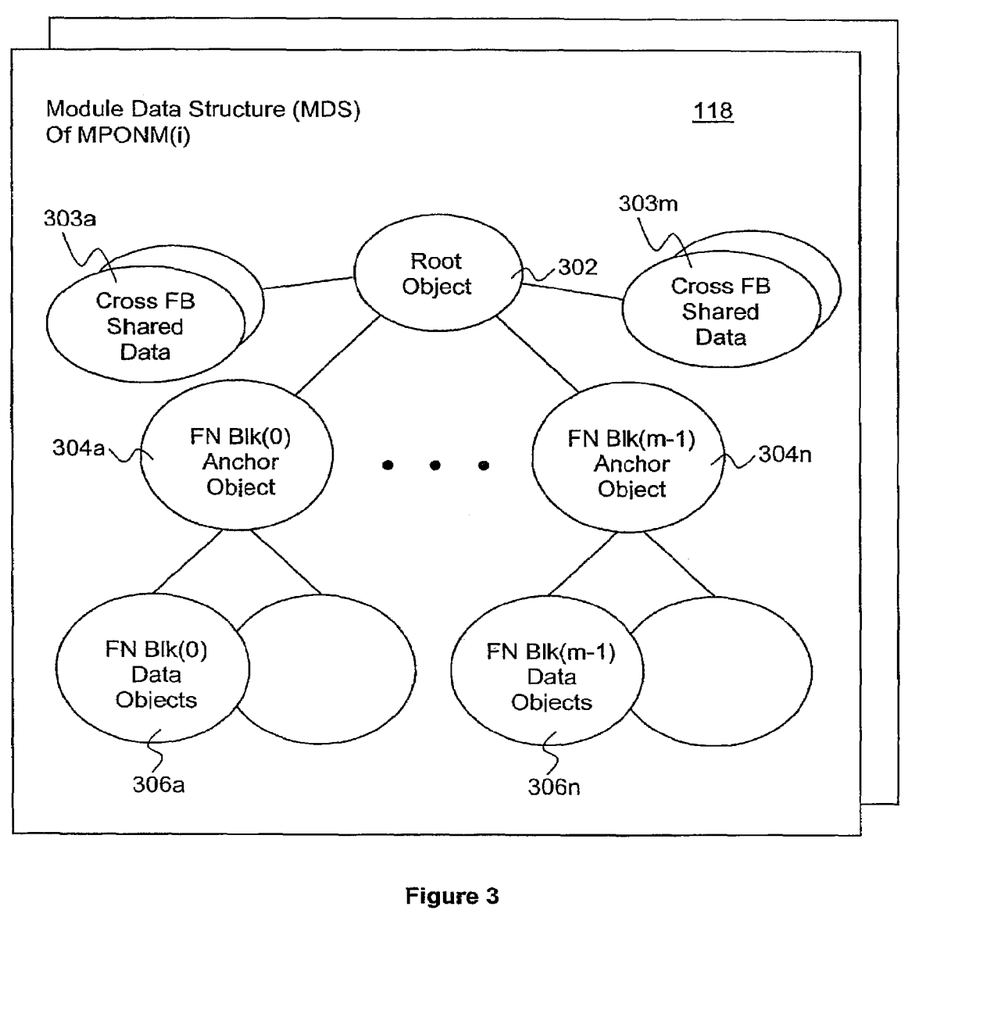
FIG. 3 illustrates the corresponding module data structures of the MPONM, employed to practice the present invention, in further detail, in accordance with one embodiment.

FIG. 3 illustrates an exemplary data organization suitable for use to store variable shared and/or function block specific data, including interrupt handling related data, to practice the present invention, in accordance with one embodiment. As illustrated, for the embodiment, module data structures 118 employed to facilitate the practice of the present invention are implemented in an object oriented manner. As described earlier, one module data structure 118 is employed for each MPONM 106.

As illustrated, each module data structure 118 includes a root object 302 and cross function block data objects 303* having cross function block shared data variables. Examples of data included in root object 302 include but are not limited to data and/or pointers employed in interacting with the appropriate device driver 117 for the particular MPONM 106*. Examples of such cross function data block shared variables include module identifier, interrupt handling related data, e.g., the registration data (FIG. 6), and registers for putting data into and getting data out of selected ones of the function blocks of the MPONM 106*.

Additionally, each module data structure 118 includes a number of "anchor" data objects 304*, one each for the function blocks supported. "Anchor" data objects 304* may include a number of function block specific control data variables. Examples of such function block specific control data variables include status variables denoting e.g. whether the corresponding function block service routine 116 was successful in performing certain requested operations.

Further, attached with each "anchor" data objects 304* of the function blocks, are function block specific data objects 306*a*, having function block specific operational data variables. Examples of such function block specific operational data variables include bit masks, data rates, filter criteria, and so forth.

In alternate embodiments, the present invention may be practiced using other data organization approaches.

Module Initialization Function

Figure 4A:
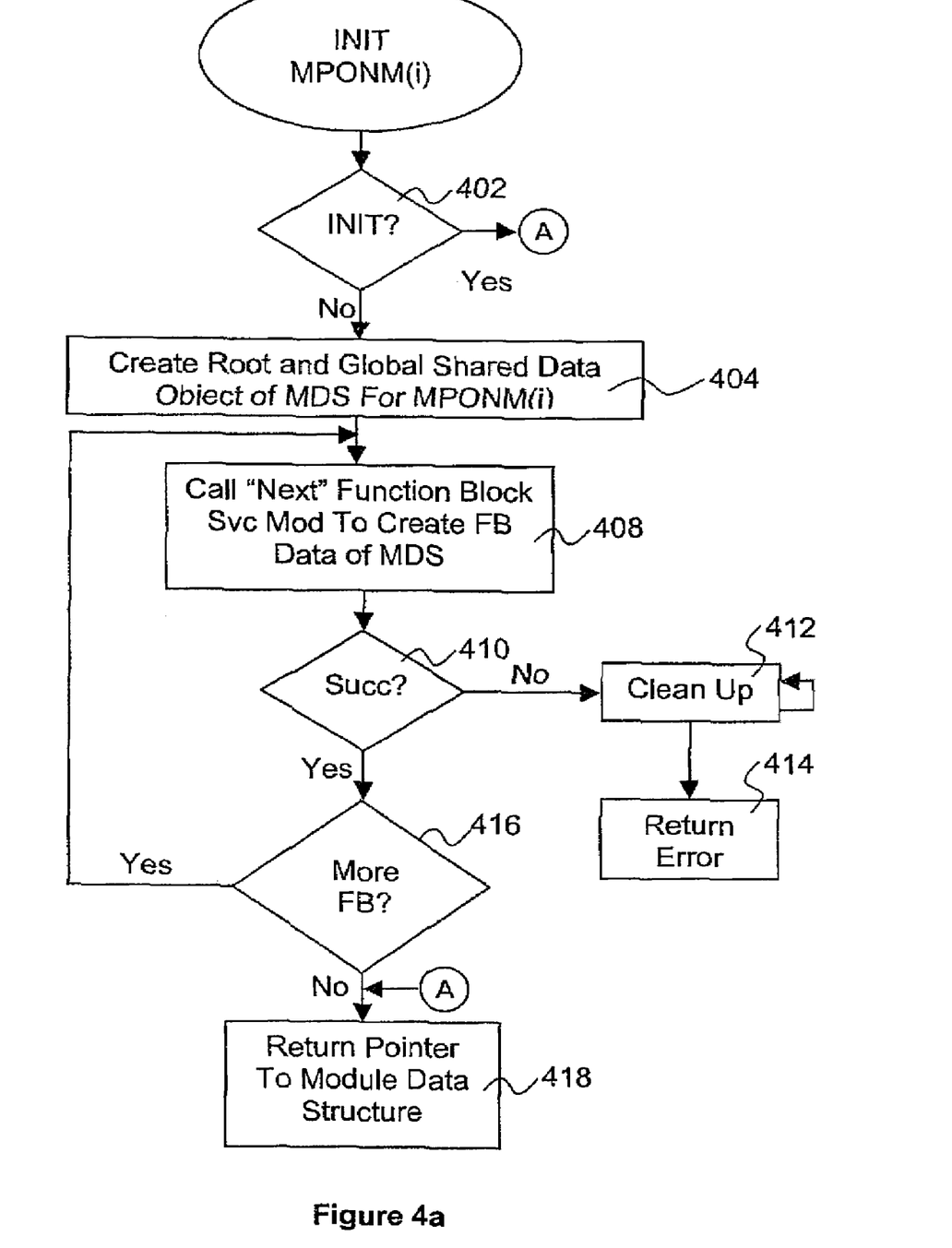
FIGS. 4a-4b illustrate the operational flow of the relevant aspects of a module initialization function of the MPONM API of the present invention, including interrupt handling initialization, in accordance with one embodiment.
Figure 4B:
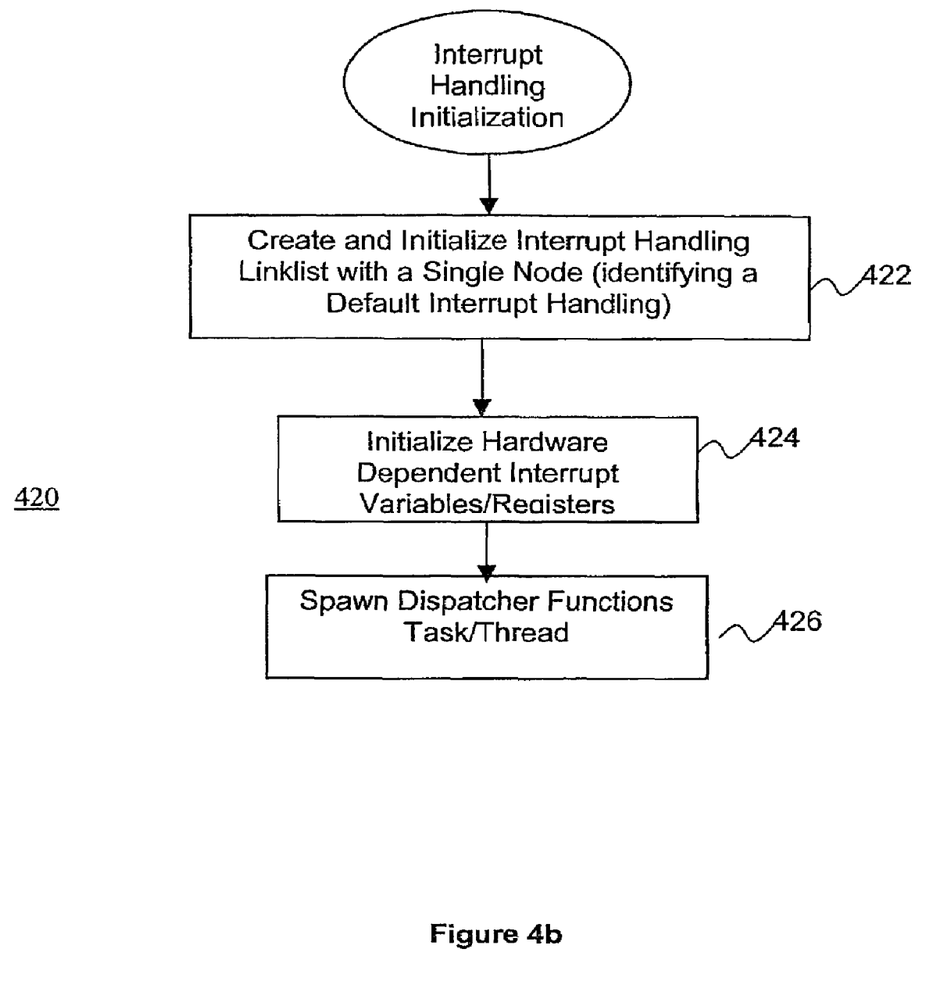

FIGS. 4*a*-4*b* illustrate the operating flow of the relevant aspects of initialization function 522 of MPONM API 114 for practicing the present invention, including initialization of the interrupt handling framework, in accordance with one embodiment. As illustrated in FIG. 4*a*, for the embodiment, upon receipt of a request to initialize a MPONM 106*, initialization function 522 of MPONM API 114 determines if the MPONM 106* has previously been initialized before, block 402. More specifically, initialization function 522 determines of the data structure 118 of the MPONM 106* has previously been created or not (e.g. as a result of responding to another initialization request for the same MPONM 106 by the same or another networking application 112). If so, initialization function 522 returns the handler/pointer of the data structure 118 of the MPONM 106 immediately, block 418.

Otherwise, i.e. if the data structure 118 has not been previously created before, initialization function 522 creates the root object 302 and global shared data objects 303* of the data structure 118 of the MPONM 106, including in particular, the data associated with the interrupt handling framework, block 404.

As illustrated in FIG. 4*b*, initialization of the data associated with the interrupt handling framework 420 includes initializing a linked list (ref. 600 of FIG. 6) (in a basic state) for storing information associated with the registered interrupt handlers, block 422. Initially, linked list 600 (in a basic state) is initialized with a single node identifying the default interrupt handler node. Linked list 600 will be further described below referencing FIG. 6.

Next, initialization function 522 initializes the hardware dependent interrupt variables/registers in control processor 102, block 424. Then, initialization function 522 spawns the internal dispatcher functions 530 task/thread, block 426.

Referring back to FIG. 4*a*, upon initializing the root and global shared data objects 302 and 303*, initialization function 522 successively calls the corresponding function block service routines 116 of the function blocks to contribute to the creation of data structure 118 to facilitate subsequent access, control or interaction with MPONM 106* by networking applications 112, block 408.

For the embodiment, after each invocation, initialization function 522 further determines if the contributory creation expected of the invoked function block service routine is successful, block 410. If an error is returned for the contributory creation, initialization function 522 successively undo all prior successful additions to the data structure 118, block 412, and returns an error notice to the network application 112, block 414.

If the contributory creation was determined to be successful at block 410, initialization function 522 further determines if additional function block service routines 114 are to be invoked, block 416. If at least one additional function block service routine 114 is to be invoked, initialization function 522 continues operation at block 408 as earlier described.

If not, the cooperation creation initialization process is completed, and initialization function 522 returns the handle/pointer of the data structure 118 of MPONM 106* as earlier described, block 418.

Resultantly, accessing, controlling or otherwise interacting with MPONM 106*, including managing interrupt handling, by networking applications 112 is streamlined.

Note that as alluded to earlier, the exact manner a function block service routine 116 contributes in the creation of the data structure of a MPONM 106*, i.e. the kind of data variables the function block service routine 116 adds to, maintain, or otherwise manipulate, using data structure 118 is application dependent. Similarly, the nature and the manner the function block service routine 116 interacts with the MPONM 106* in particular the function block, are application dependent. These issues vary from function blocks to function blocks.

For ease of understanding, initialization function 522 has been logically described as a single functional entity. In practice, the functions performed by initialization function 522 may be implemented in one or more sub-functions, e.g. having all interrupt related initialization operations be implemented in its own interrupt related initialization sub-function.

Organization of Interrupt Registration Data

Figure 6:
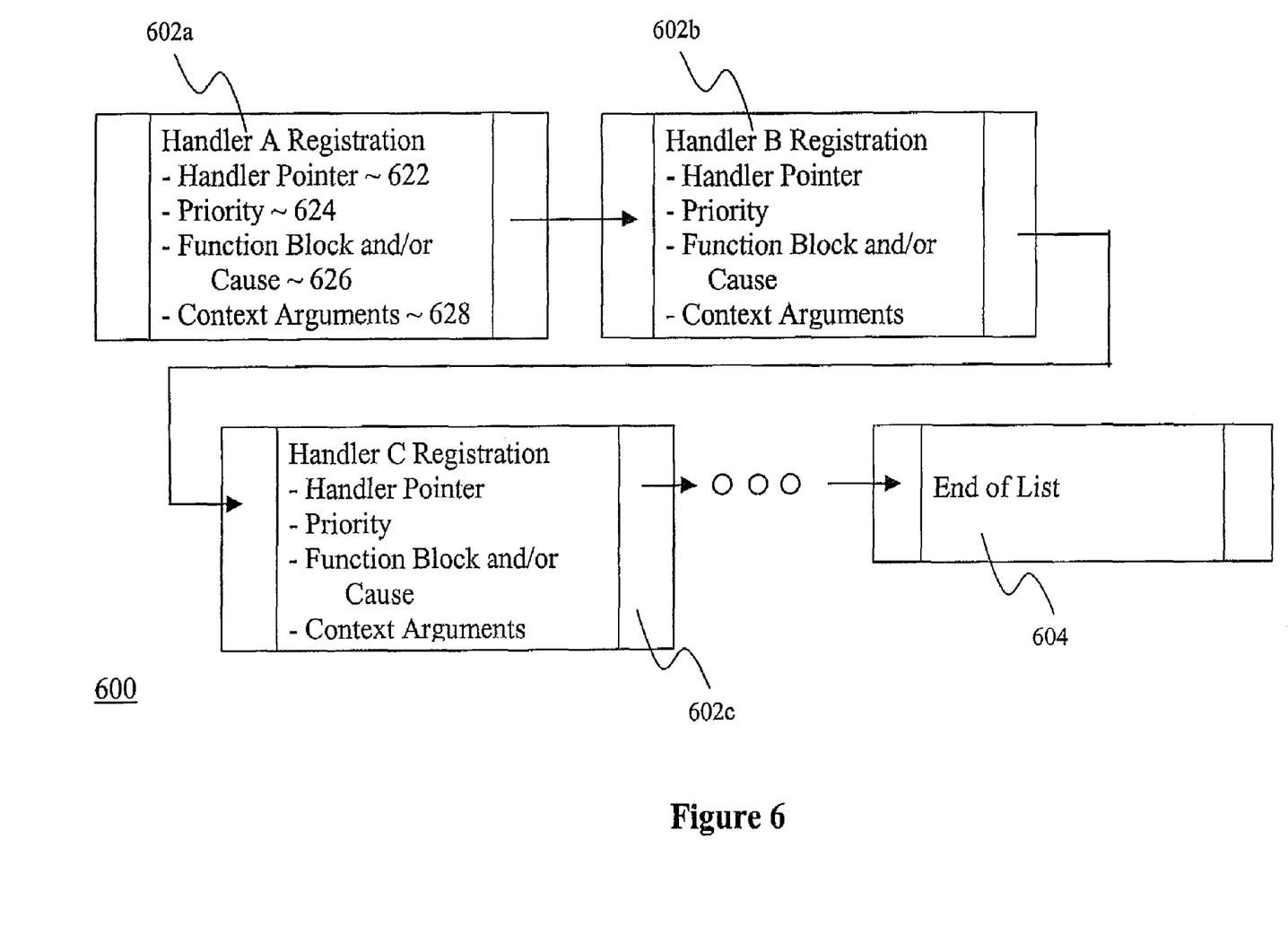
FIG. 6 illustrates an example data organization for storing interrupt handler registration data, in accordance with one embodiment.

FIG. 6 illustrates a data organization suitable for use to store the interrupt handler registration data, in accordance with one embodiment. For the embodiment, as described earlier, the interrupt handler registration data are organized and stored in a linked list 600. Each linked entry 602* (also referred to as a "node"), except for the last "end of link" entry 604, is employed to store the registration data of a registered interrupt handler 113.

For the embodiment, the registration data of a registered interrupt handler 113 includes a pointer 622 to the interrupt handler itself. Further, the registration data includes one or more triggering function block interest and/or one more triggering cause interest 626. That is, the registration data specifies the interrupts the registered interrupt handler 113 is interested in, accordingly to be notified, in terms of at least one of an interrupt's triggering function block and cause.

As alluded to earlier, an interrupt handler registration may specify that an interrupt handler 113 is to be notified of all interrupts triggered by one or more function blocks of any MPONM, irrespective of causes. An interrupt handler registration may also specify that an interrupt handler 113 is to be notified of all interrupts triggered by one or more function blocks of any MPONM, of particular respective causes. Likewise, an interrupt handler registration may specify that an interrupt handler 113 is to be notified of all interrupts of one or more causes, irrespective of the triggering function blocks.

For the embodiment, the registration data also includes a priority 624 of the registered interrupt handler. Recall from earlier description that more than one interrupt handlers may be registered by networking applications 112 to handle interrupts of certain function blocks and/or causation events. Accordingly, more than one interrupt handlers may be notified for one received interrupt. For the embodiment, priority 624 is employed to order the dispatching of the notifications for the received interrupts. For ease of operation, entries/nodes 602* are linked in order of their priorities.

For the embodiment, networking applications 112 may also register one or more context variables 628 to be provided to the interrupt handler on invocation. One use of context variables 628 is to enable the same interrupt handler to be shared by multiple MPONM 106*. The interrupt handler 113 determines the applicable MPONM 116* for an interrupt based on the value of these context variables 628 at the time the interrupt handler 113 is invoked.

Interrupt Handler Register Function

As described earlier, interrupt handler register function 524 is employed to facilitate networking applications 112 in providing, or more specifically, registering provided interrupt handlers 113 to handle interrupts of various types. For the embodiment employing the data structure of FIG. 6 to store the registration data of the registered interrupt handlers 113, in response to a request to register an interrupt handler 113, interrupt handler register function 524 adds an entry 602* to linked list 600, and stores the pointer of the interrupt handler 113, and its interest, i.e. triggering function blocks, causes, and/or other properties, therein. As described earlier, in one embodiment, the registration data are linked in the order of priority of the registered interrupt handlers 113.

In response to a request to un-register an interrupt handler 113, interrupt handler register function 524 removes the appropriate entry 602* from linked list 600.

Enabling/Disabling Function Block/Event Type Interrupt Functions

As described earlier, Enabling/Disabling Function Block/Event Type Interrupt functions 526-528 are employed to facilitate networking applications 112 to enable/disable a function block to generate interrupts during operation, in general, or for occurrences of events of particular event types. For the illustrated embodiment, when requested by networking applications 112, Enabling/Disabling Function Block/Event Type Interrupt functions 526-528 invoke the corresponding function block service routines 116 to accomplish the requested interrupt generation allowance enabling/disabling.

Interrupt Dispatcher Functions

As described earlier, interrupt dispatcher functions 530 are employed to determine which if any of the registered interrupt handlers 113 are to be notified of an interrupt, to handle the interrupt. For the embodiment employing the data structure of FIG. 6 to store the interrupt handler registration data, interrupt dispatcher function 530 identifies the interrupt handlers 113 to be notified by systematically analyzing entries/nodes 602* of linked list 600. The stored function block and/or cause interests of each registered interrupt handler are examined to determine if the corresponding registered interrupt handler 113 is to be notified. If so, the identified interrupt handler or handlers 113 are notified accordingly.

Recall in various embodiments, the entries/nodes 602* are linked in the order of priority of the registered interrupt handlers. Accordingly, the interests are analyzed on a priority basis.

Interrupt Handling Method

Figure 7:
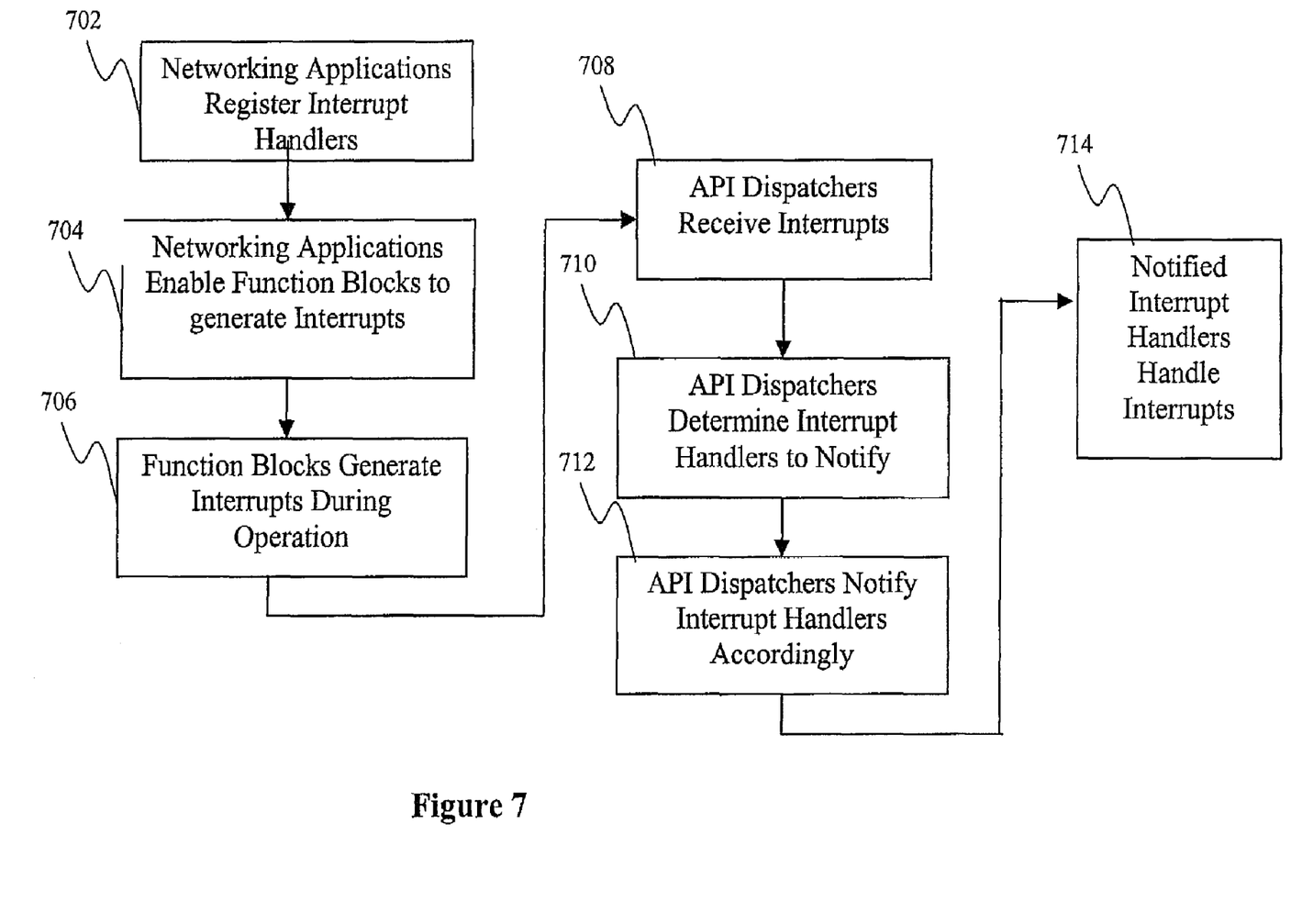
FIG. 7 illustrates the interrupt handling method of the present invention, in accordance with one embodiment.

FIG. 7 illustrates the interrupt handling method of the present invention, in accordance with one embodiment. As illustrated and alluded earlier, networking applications 112 first register interrupt handlers 113 for handling interrupts of various types, block 702. Then, networking applications 112 selectively various function blocks generate interrupts during operation, in general, or for occurrences of events of particular event types, block 704.

During operation, the various function blocks of the various MPONM 106* generate various interrupts when various events occur, block 706. The causes of the interrupts, as described earlier, are stored in the control/status registers of the triggering function blocks, and identities of the triggering function blocks are stored in the global control/status registers of the MPONM 106*. The generated interrupts are routed to interrupt handler dispatcher functions 530, block 708.

As described earlier, interrupt handler dispatcher functions 530 first clear the interrupts, then systematically examine the interrupt handler registration data to determine which if any of the registered interrupt handlers 113 are to be notified to handle the interrupts, block 710. Upon determining the interrupt handlers 113 to be notified, interrupt handler dispatcher functions 530 notify the identified interrupt handlers 113 accordingly, block 712.

Upon being notified, the interrupt handlers 113 handle the interrupts as the designer of networking applications 112 desire, block 714.

Conclusion and Epilogue

Thus, it can be seen from the above descriptions, a novel highly flexible MPONM API equipped to streamline and improve the ease of network applications in accessing, controlling or otherwise interacting with function blocks of multi-protocol processors of MPONM, including flexible interrupt handling, has been described. While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In an optical networking apparatus having a plurality of multi-protocol optical networking modules (MPONM), each having a plurality of function blocks, a method of operation comprising:
   receiving a first interrupt from a first of the MPONM;
   accessing the first MPONM to determine which of the function blocks of the first MPONM triggered the first interrupt, and a cause for the first interrupt;
   determining, based at least in part on the results of said function block and causation determination, whether any interrupt handler provided by networking application(s) is to be notified of the first interrupt; and
   notifying one or more provided interrupt handlers accordingly, based at least in part on the result of the interrupt handler determination for the first interrupt.

2. The method of claim 1, wherein said accessing of the first MPONM to determine which of the function blocks of the first MPONM triggered the first interrupt and a cause of the first interrupt comprises accessing a global register of the first MPONM to retrieve an identifier of the triggering function block to make said function block determination.

3. The method of claim 1, wherein said accessing of the first MPONM to determine which of the function blocks of the first MPONM triggered the first interrupt and a cause for the first interrupt comprises accessing a status register of the triggering function block of the first MPONM to retrieve a triggering event type to make said causation determination.

4. The method of claim 1, wherein said determining of whether any interrupt handler provided by networking application(s) is to be notified of the first interrupt comprises examining a plurality of interrupt handler registrations for potential interest by registered interrupt handlers, using at least part of the results of the function block and causation determinations, each of said interrupt handler registrations including at least a selected one of a triggering function block interest and a cause interest.

5. The method of claim 2, wherein said accessing of the first MPONM to determine which of the function blocks of the first MPONM triggered the first interrupt and a cause for the first interrupt further comprises accessing a status register of the triggering function block of the first MPONM to retrieve a triggering event type to make said causation determination.

6. The method of claim 4, wherein said notifying of one or more provided interrupt handlers accordingly comprises calling each registered interrupt handler determined as having interest in the first interrupt.

7. The method of claim 4, wherein the method further comprises registering said interrupt handlers, responsive to one or more registration requests by one or more networking applications.

8. The method of claim 4, wherein the method further comprises enabling a function block service routine to allow receipt of interrupts, responsive to a request of a networking application.

9. The method of claim 4, wherein the method further comprises enabling a function block service routine to allow receipt of interrupts for one or more event types, responsive to a request of a networking application.

10. The method of claim 6, wherein said notifying of one or more provided interrupt handlers accordingly further comprises providing each of the called interrupt handler with one or more registered context variables.

11. The method of claim 7, wherein said registering of the interrupt handlers further comprises registering for an interrupt handler one or more context variables to be provided to the interrupt handler on invocation.

12. A networking apparatus comprising:
    a plurality of multi-protocol optical networking modules (MPONM), each having a plurality of function blocks;
    memory coupled to the plurality of MPONM, having stored therein a plurality of programming instructions implementing one or more interrupt dispatchers, collectively equipped to
    receive interrupts from said function blocks of the MPONM, and for each received interrupt,
    access an MPONM to determine which of the function blocks of the MPONM triggered the interrupt, and cause(s) for the interrupt,
    determine, based at least in part on the results of said function block and causation determinations, whether any interrupt handler provided by networking application(s) is to be notified of the interrupt, and
    notifying one or more provided interrupt handlers accordingly, based at least in part of the result of the interrupt handler determination for the interrupt; and
    at least one processor coupled to the memory and the plurality of MPONM to execute the programming instructions.

13. The apparatus of claim 12, wherein said programming instructions implement the dispatcher functions to access a MPONM to determine which of the function blocks of the MPONM triggered an interrupt and a cause of the interrupt by accessing a global register of the MPONM to retrieve an identifier of the triggering function block.

14. The apparatus of claim 12, wherein said programming instructions further implement the dispatcher functions to access a MPONM to determine which of the function blocks of the MPONM triggered the interrupt and a cause for the interrupt by accessing a status register of the triggering function block of the MPONM to retrieve a triggering event type.

15. The apparatus of claim 12, wherein said programming instructions implement the dispatcher functions to determine whether any interrupt handler provided by networking application(s) is to be notified of the interrupt by examining a plurality of interrupt handler registrations for potential interest by registered interrupt handlers, using at least part of the results of the function block and causation determinations, each of said interrupt handler registrations including at least a selected one of a triggering function block interest and a cause interest.

16. The apparatus of claim 13, wherein said programming instructions further implement the dispatcher functions to access a MPONM to determine which of the function blocks of the MPNM triggered the interrupt and a cause for the interrupt by accessing a status register of the triggering function block of the MPONM to retrieve a triggering event type.

17. The apparatus of claim 15, wherein said programming instructions implement the dispatcher functions to notify one or more provided interrupt handlers by calling each registered interrupt handler determined as having interest in the first interrupt.

18. The apparatus of claim 17, wherein said programming instructions further implement the dispatcher functions to notify one or more provided interrupt handlers by providing each of the called interrupt handler with one or more registered context variables.

19. The apparatus of claim 17, wherein the programming instructions further implement an interrupt handler registration function to register said interrupt handlers, responsive to one or more registration requests by one or more networking applications.

20. The apparatus of claim 19, wherein the programming instructions further implement an interrupt register function to register for an interrupt handler, one or more context variables to be provided to the interrupt handler on invocation.

21. The apparatus of claim 20, wherein the programming instructions further implement an enabling function to enable a function block to generate interrupts during operation, at the occurrences of selected events, responsive to a request of a networking application.

22. The apparatus of claim 20, wherein the programming instructions further implement an enabling function to enable a function block to generate interrupts during operation for occurrence of events of one or more event types, responsive to a request of a networking application.

23. In an optical networking apparatus having a plurality of multi-protocol optical networking modules (MPONM), a method of operation comprising:
receiving a first interrupt from a first MPONM;
accessing the first MPONM to determine which of a plurality of function blocks associated with said first MPONM generated the first interrupt, and to identify a cause for the first interrupt;
determining whether any interrupt handler provided by networking application(s) is to be notified about said first interrupt, based at least in part on a result of said accessing to determine and to identify; and
notifying said interrupt handler about the first interrupt.

24. The method of claim 23, wherein said accessing comprises accessing a global register of the first MPONM to retrieve an identifier related to the function block generating said first interrupt.

25. The method of claim 23, wherein said accessing comprises accessing a status register of the function block generating said first interrupt to retrieve a triggering event type.

26. The method of claim 23, wherein said determining comprises examining a plurality of interrupt handler registrations related to at least a portion of the plurality of interrupt handlers for an occurrence of at least one of an identifier for the function block generating said first interrupt and an identifier for the triggering event type.

27. The method of claim 23, wherein the method further comprises clearing said first interrupt.

28. The method of claim 23, wherein the method further comprises accessing a priority for said interrupt handler.

29. The method of claim 23, wherein the method further comprises clearing said first interrupt stopping generation of an interrupt for an event, if a prior generation of the interrupt for said event was unacknowledged.

30. The method of claim 23, wherein the method further comprises requesting unregistration of a previously registered interrupt handler.

31. The method of claim 24, wherein said accessing comprises accessing a status register of the function block generating said first interrupt to retrieve a triggering event type.

32. The method of claim 26, wherein said notifying comprises calling at least one interrupt handler having an interrupt handler registration determined by said examining to include said occurrence of at least one of the identifier for the function block generating said first interrupt and the identifier for the triggering event type.

33. The method of claim 26, wherein the method further comprises registering at least a portion of the plurality of said interrupt handlers, responsive to at least one registration request by at least one networking application.

34. The method of claim 26, wherein the method further comprises enabling a function block service routine to allow receipt of interrupts, responsive to a request of a networking application.

35. The method of claim 26, wherein the method further comprises enabling a function block service routine to allow receipt of interrupts for one or more event types, responsive to a request of a networking application.

36. The method of claim 33, wherein said registering further comprises registering at least one context variable for an interrupt handler being registered.

37. The method of claim 28, wherein said determining is further based at least in part on said priority and the result of said accessing to determine and to identify.

38. The method of claim 30, wherein the method further comprises removing registration of a previously registered interrupt handler, in response to said unregistration request.

39. The method of claim 32, wherein said notifying further comprises providing at least one called interrupt handler with at least one registered context variable.

40. The method of claim 33, wherein the method further comprises requesting unregistration of a previously registered interrupt handler.

41. The method of claim 40, wherein the method further comprises removing registration of a previously registered interrupt handler, in response to said unregistration request.

42. A networking apparatus comprising:
a plurality of multi-protocol optical networking modules (MPONM), at least one of said MPONM including a plurality of function blocks;
memory coupled to the plurality of MPONM, said memory having stored therein a plurality of programming instructions implementing one or more interrupt dispatchers, said one or more interrupt dispatchers being responsive to receipt of an interrupt generated by at least one of said function blocks and being adapted for:
accessing an MPONM to determine which of the plurality of function blocks generated the interrupt, and to identify at least one cause for the interrupt;
determining whether any interrupt handler provided by networking application(s) is to be notified about said first interrupt, based at least in part on a result of said accessing to determine and to identify; and
notifying said interrupt handler about the first interrupt; and
at least one processor coupled to the memory and the plurality of MPONM to execute the programming instructions.

43. The apparatus of claim 42, wherein said accessing includes accessing a global register of the MPONM to retrieve an identifier related to the function block generating said interrupt.

44. The apparatus of claim 42, wherein said accessing comprises accessing a status register of the function block generating said interrupt to retrieve a triggering event type.

45. The apparatus of claim 42, wherein said determining comprises examining a plurality of interrupt handler registrations related to at least a portion of the plurality of interrupt handlers for an occurrence of at least one of an identifier for the function block generating said interrupt and an identifier for the triggering event type.

46. The apparatus of claim 42, wherein said one or more interrupt dispatchers is further adapted for clearing said interrupt.

47. The apparatus of claim 42, wherein said one or more interrupt dispatchers is further adapted for accessing a priority for said interrupt handler.

48. The apparatus of claim 42, wherein said one or more interrupt dispatchers is further adapted for clearing said first interrupt stopping generation of an interrupt for an event, if a prior generation of the interrupt for said event was unacknowledged.

49. The apparatus of claim 42, wherein said one or more interrupt dispatchers is further adapted for requesting unregistration of a previously registered interrupt handler.

50. The apparatus of claim 43, wherein said accessing comprises accessing a status register of the function block generating said interrupt to retrieve a triggering event type.

51. The apparatus of claim 45, wherein said notifying comprises calling at least one interrupt handler having an interrupt handler registration determined by said examining to include said occurrence of at least one of the identifier for the function block generating said interrupt and the identifier for the triggering event type.

52. The apparatus of claim 45, wherein said one or more interrupt dispatchers is further adapted for enabling a function block to generate at least one interrupt, in response to a request of a networking application, said at least one interrupt being related to an occurrence of selected events.

53. The apparatus of claim 45, wherein said one or more interrupt dispatchers is further adapted for enabling a function block to generate at least one interrupt, in response to a request of a networking application, said at least one interrupt being related to an occurrence of events of one or more event types.

54. The apparatus of claim 47, wherein said determining is further based at least in part on said priority and the result of said accessing to determine and to identify.

55. The apparatus of claim 49, wherein said one or more interrupt dispatchers is further adapted for removing registration of a previously registered interrupt handler, in response to said unregistration request.

56. The apparatus of claim 51, wherein said notifying further comprises providing at least one called interrupt handler with at least one registered context variable.

57. The apparatus of claim 51, wherein said one or more interrupt dispatchers is further adapted for registering at least a portion of the plurality of said interrupt handlers, responsive to at least one registration request by at least one networking application.

58. The apparatus of claim 57, wherein said one or more interrupt dispatchers is further adapted for registering at least one context variable for an interrupt handler being registered.

59. The apparatus of claim 57, wherein said one or more interrupt dispatchers is further adapted for requesting unregistration of a previously registered interrupt handler.

60. The apparatus of claim 59, wherein said one or more interrupt dispatchers is further adapted for removing registration of a previously registered interrupt handler, in response to said unregistration request.

* * * * *